United States Patent [19]

Ogihara et al.

[11] Patent Number: 5,793,544
[45] Date of Patent: Aug. 11, 1998

[54] PRODUCTION PROCESS OF COMPOSITE OPTICAL FILTER

[75] Inventors: Takeo Ogihara; Hiroki Katono; Masuhiro Shouji; Teruo Sakagami, all of Iwaki, Japan

[73] Assignee: Kureha Kagaku Kogyo Kabushiki Kaisha, Tokyo, Japan

[21] Appl. No.: 554,275

[22] Filed: Nov. 6, 1995

[30] Foreign Application Priority Data

Nov. 17, 1994 [JP] Japan .................. 6-308144

[51] Int. Cl.$^6$ .................. G02B 5/22; G02B 5/28; F21V 9/00
[52] U.S. Cl. .................. 359/885; 359/580; 359/350; 252/582
[58] Field of Search .................. 359/350, 359, 359/360, 361, 885, 886; 252/582

[56] References Cited

U.S. PATENT DOCUMENTS

| | | | |
|---|---|---|---|
| 4,626,740 | 12/1986 | Fitzpatrick | 359/886 |
| 5,020,884 | 6/1991 | Murphy | 359/886 |
| 5,390,045 | 2/1995 | Bernard | 359/361 |
| 5,466,755 | 11/1995 | Sakagami et al. | 525/326.6 |

FOREIGN PATENT DOCUMENTS 6-118228  4/1994  Japan .

*Primary Examiner*—Paul M. Dzierzynski
*Assistant Examiner*—Audrey Chang
*Attorney, Agent, or Firm*—Frishauf, Holtz, Goodman, Langer & Chick, P.C.

[57] ABSTRACT

A component optical filter and a process for production of the filter includes the steps of arranging a pair of transparent plates, at least one of which has an optical low-pass filtering function, to oppose each other with a gap therebetween and filling the gap with a monomer composition of the formula $PO(OH)_nR_3$-n wherein R is a polymerizable functional group represented by $CH_2=CXCOO(C_2H_4O)_m$- and (c) a metallic compound composed of a copper compound, and then subjecting the monomer composition to a polymerization treatment. The result is a laminated composite filter having at least one optical low-pass filter and an intermediate layer forming a luminosity factor-compensating filter.

5 Claims, 1 Drawing Sheet

PRODUCTION PROCESS OF COMPOSITE OPTICAL FILTER

BACKGROUND OF THE INVENTION

1) Field of the Invention

The present invention relates to a process for production of a composite optical filter suitable for use in video cameras and the like, and more particularly to a process for production of a composite optical filter which integrally comprises a filter element having an effect of blocking or attenuating rays in the wavelength range of a near infrared region with high efficiency and a luminosity factor-compensating function, and another filter element having an optical low-pass filtering function.

2) Description of the Background Art

Combinations of an optical low-pass filter and a luminosity factor-compensating filter made of glass are generally mounted in various electronic optical devices such as video cameras and electronic still cameras.

A quartz plate, or a glass plate or plastic plate on a surface of which a diffraction grating has been formed is used as such an optical low-pass filter. On the other hand, a filter made of a special glass material in which a copper ion has been introduced in phosphate glass is used as such a luminosity factor-compensating filter.

However, the above luminosity factor-compensating filter tends to absorb moisture and moreover, is low in impact resistance and poor in processing and/or machining property upon forming or molding, cutting, polishing and/or the like because it is made of glass. Therefore, there has been proposed a luminosity factor-compensating filter made of a plastic which is light-weight, hard to absorb moisture and easy to be processed and machined by forming or molding, polishing and the like upon its production (Japanese Patent Application Laid-Open No. 118228/1994). A composite optical filter obtained by combining this plastic optical filter with a quartz plate and having both luminosity factor-compensating function and optical low-pass filtering function at the same time can much improve various problems offered in the case where the filter made of the phosphate glass is used.

In order to achieve good optical properties in a composite optical filter, there has heretofore been widely used a method for production in which a filter element having an optical low-pass filtering function is uniformly bonded to another filter element having a luminosity factor-compensating function with an adhesive excellent in transparency, thereby laminating both filter elements.

However, this method involves a problem that since a quartz plate, or a glass plate, on the surface of which a diffraction grating has been formed, being used as the optical low-pass filter element, and the plastic optical filter for luminosity factor compensation differ greatly in material and hence in thermal properties such as thermal expansion or heat shrinkage, the degree of adhesive property to the adhesive used, and the like, it is difficult to firmly bond both filter elements to each other. Besides, even when a plastic plate is used as the optical low-pass filter element, the same problem as described above is offered because it differs in material from the plastic optical filter element for luminosity factor compensation.

Under the foregoing circumstances, there has thus been a strong demand for development of a production process of a composite optical filter composed of a laminate of a filter element having an optical low-pass filtering function and another filter element having a luminosity factor-compensating function and combining both functions with each other, wherein the process requires no complicated step such as bonding step.

SUMMARY OF THE INVENTION

The present invention has been made in view of the foregoing circumstances and has as its object the provision of a process for production of a composite optical filter which is light-weight and hard to absorb moisture and integrally comprises a first filter element having a function to block or attenuate rays in the wavelength range of a near infrared region with high efficiency (hereinafter referred to as "a near-infrared region-blocking function") as well as a luminosity factor-compensating function, and a second filter element having an optical low-pass filtering function, wherein the process includes no step of adhesive-bonding the filter element having the optical low-pass filtering function to the filter element having the luminosity factor-compensating function and permits the production of the desired composite optical filter by a simple process.

According to the present invention, there is thus provided a process for production of a composite optical filter, which comprises the steps of arranging a pair of transparent plates at least one of which has an optical low-pass filtering function, so as to oppose to each other with a gap, thereby forming a mold in which a cavity for cast polymerization is defined between the pair of transparent plates; and filling a monomer composition composed of (a) a monomer represented by the following formula I:

$$PO(OH)_n R_{3-n} \qquad \text{I}$$

wherein R means a polymerizable functional group represented by the following formula II:

$$CH_2=CXCOO(C_2H_4O)_m- \qquad \text{II}$$

in which X denotes a hydrogen atom or a methyl group, and m is an integer of 1–5, and n is 1 or 2, (b) a monomer copolymerizable therewith, and (c) a metallic compound composed of a copper compound, into the cavity of the mold, thereby subjecting the monomer composition to a polymerization treatment.

According to the present invention, there is also provided a composite optical filter comprising a pair of transparent plates at least one of which has an optical low-pass filtering function, and an intermediate filter layer laminated so as to interpose between the pair of transparent plates, wherein the intermediate layer is formed of a copolymer formed by polymerizing a monomer composition composed of (a) a monomer represented by the following formula I:

$$PO(OH)_n R_{3-n} \qquad \text{I}$$

wherein R means a polymerizable functional group represented by the following formula II:

$$CH_2=CXCOO(C_2H_4O)_m- \qquad \text{II}$$

in which X denotes a hydrogen atom or a methyl group, and m is an integer of 1–5, and n is 1 or 2, (b) a monomer copolymerizable therewith, and (c) a metallic compound composed of a copper compound, in a cavity for cast polymerization defined between the pair of transparent plates.

As understood from the above, the production process of the composite optical filter according to the present invention features that a transparent plate having an optical low-pass filtering function is used as at least one of a pair of mold plates, which make up a mold for cast polymerization, and a specific monomer composition, which provides a polymer having a near infrared region-blocking function and a luminosity factor-compensating function, is cast-polymerized in a cavity defined by these mold plates.

According to such a production process, the polymerization of the monomer composition is allowed to proceed within the cavity of the mold, whereby a polymer having the above-described properties is formed in a state that the cast polymer product is firmly joined to the mold plate having the optical low-pass filtering function. Accordingly, upon completing the cast polymerization of the monomer composition, a composite optical filter, in which a first filter element formed by the cast polymerization having the near infrared region-blocking function and the luminosity factor-compensating function is firmly joined to a second filter element having the optical low-pass filtering function, can be produced by a simple process, and so a step of bonding both filter elements with an adhesive becomes useless.

The composite optical filter obtained in accordance with the production process of the present invention comprises the first filter element having the near infrared region-blocking function and the luminosity factor-compensating function and the second filter element having the optical low-pass filtering function, wherein the filter elements have been integrally joined, and hence can exhibits all the optical properties inherent in both filter elements and moreover is excellent in thermal shock resistance, solvent resistance and durability such as light resistance and weather resistance. Therefore, such a composite optical filter can be suitably used in imaging devices such as CCD for various electronic optical instruments such as video cameras and electronic still cameras.

DETAILED DESCRIPTION OF THE INVENTION AND PREFERRED EMBODIMENTS

The present invention will hereinafter be described in detail with reference to the drawings.

Figure 1A:
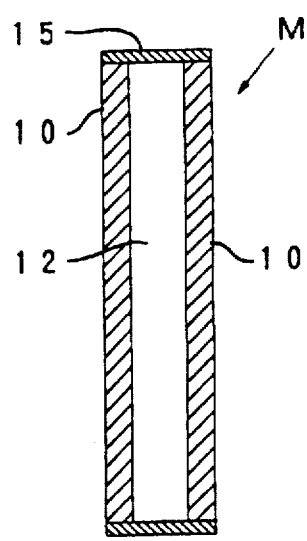
FIG. 1A is a cross-sectional view illustrating a mold according to an embodiment of the process for production of a composite optical filter of the present invention.

In the production process of a composite optical filter according to the present invention, a pair of mold plates 10, 10, which are each composed of a transparent flat plate, are arranged in parallel so as to oppose to each other with a gap or space, for example, as illustrated in FIG. 1A. A sealing and fixing member 15 composed of a pressure sensitive adhesive tape is then provided in common along the outer peripheral surfaces of the pair of mold plates 10, 10 to fix both mold plates and at the same time, cover the outer periphery of the gap, thereby making up a mold M having a cavity 12 for cast polymerization surrounded by the mold plates 10, 10 and the sealing and fixing member 15. Here, a transparent plate having an optical low-pass filtering function and composed of a quartz plate, or a transparent glass plate or plastic plate, on the surface of which a diffraction grating has been formed, is used as one or both of the pair of mold plates 10, 10.

Figure 1B:
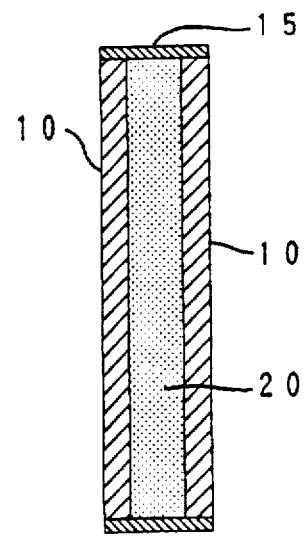
FIG. 1B is a cross-sectional view illustrating a state that a monomer composition has been filled into a cavity of the mold.

As illustrated in FIG. 1B, a monomer composition, which provides a polymer having a near infrared region-blocking function and a luminosity factor-compensating function, or specifically, a monomer composition 20 composed of (a) a monomer represented by the formula I (hereinafter may also referred to as "a specific phosphate group-containing monomer"), (b) a monomer copolymerizable therewith, and (c) a metallic compound composed of a copper compound is filled into the cavity 12 for cast polymerization of the mold M, and is cast-polymerized to produce a composite optical filter in which a filter element having a luminosity factor-compensating function is integrally combined with a filter element having an optical low-pass filtering function in a state that a molded product of the polymer formed has been joined to the inner wall surfaces of the mold plates 10, 10 defining the cavity 12.

In cast polymerization, it is generally attempted to coat inner wall surfaces of a mold, by which a cavity is defined, with a releasing agent in advance in order to facilitate removing a molded product of a polymer out of the mold after completion of the polymerization. When cast polymerization is performed without using any releasing agent, a molded product of a polymer formed is generally joined to the mold plates with great strength. Therefore, it is often difficult to separate the molded product of the polymer from the mold.

Contrastively, a great feature of the process of the present invention is in that a composite, in which a molded product of the resultant polymer has been firmly joined to the mold plates with the polymerization of the monomer composition, as described above, is formed by making good use of the easy joining of the molded product of the polymer to the mold plates, which has heretofore been said to be a defect in the cast polymerization.

In the production process of the present invention, a transparent plate having an optical low-pass filtering function, or specifically, a quartz plate, or a transparent glass plate or plastic plate, on the surface of which a diffraction grating has been formed, is used as at least one of the mold plates.

Quartz has anisotropy of refractive index and hence possesses the optical low-pass filtering function by which a high spatial frequency component of light from a subject is limited by making use of this anisotropy to remove color components different from that of the subject, which are attendant on the generation of false signals.

A glass plate or plastic plate, on the surface of which a diffraction grating has been formed, also has an optical low-pass filtering function, and it may be used as the transparent plate having an optical low-pass filtering function in the production process of the present invention.

When the glass plate or plastic plate, on the surface of which a diffraction grating has been formed, is used as a transparent plate having an optical low-pass filtering function, it is only necessary to form a diffraction grating layer ranging from several microns to several tens microns in thickness on the surface of the glass plate or plastic plate by, for example, vacuum deposition. The thickness of this diffraction grating layer is as very small as about a tenth of the thinnest quartz plate to be used, and so the thickness of such a transparent plate may be lessened. Therefore, a light-weight and small-sized filter element having an optical low-pass filtering function can be effectively obtained.

Typical examples of the plastic plate having an optical low-pass filtering function, on the surface of which such a diffraction grating has been formed, and which can be used as a mold plate in the production process of the present invention, include transparent plastic plates separately formed of crosslinked acrylic resins, polycarbonates, poly-4-methylpentene-1, amorphous polyolefins, modified norbornene resins, alicyclic acrylic resins, acrylonitrile-methyl acrylate copolymer resins, amorphous polyethylene terephthalate resins and the like.

Besides the above, any plastic plate may be used so far as it does not swelled with or dissolved in the monomer or monomer composition to be polymerized in the cavity, and has high bond property to the polymer to be formed and excellent transparency.

As a method of forming a diffraction grating on the surface of a transparent glass plate, there may be used the conventional method for producing a glass diffraction grating. On the other hand, as methods for forming a diffraction grating on the surface of a transparent plastic plate, there may be used various processes such as a process in which cast polymerization is conducted by means of a mold on the inner surface of which a negative pattern of the diffraction grating has been formed, thereby obtaining a molded product of a polymer, on the surface of which the diffraction grating has been formed, a process in which a plastic material is subjected to injection molding by means of a mold on the inner surface of which a negative pattern of the diffraction grating has been formed, a process in which a stamper, on which a negative pattern of the diffraction grating has been formed, is brought into contact under heat with the surface of a transparent plastic plate, a process in which a photosensitive resin is evenly coated on the surface of a transparent plastic plate and then subjected to exposure and development with a mask pattern having a diffraction grating image, thereby forming a resin layer having a diffraction grating pattern on the transparent plastic plate, and a process in which a filmy diffraction grating member formed from an optical resin in advance is laminated on a transparent plastic plate.

In the production process according to the present invention, the quartz plate, or the transparent glass plate or plastic plate, on the surface of which the diffraction grating has been formed, to be used as a mold plate is generally a flat plate having a thickness of 0.3–5 mm, preferably 0.5–3 mm.

If the thickness of such a plate is thinner than 0.3 mm, its handling properties are poor, and the evenness of the thickness of a polymer product to be obtained by the cast polymerization also becomes liable to be lowered due to the deformation of the plate. On the other hand, any thickness exceeding 5 mm results in a composite optical filter having a too great thickness as a whole. It is hence not preferable to use a mold plate having any thickness outside the above range.

When a film small in thickness and hence liable to be deformed is used as a mold plate, a rigid support plate such as a glass plate or metal plate may be applied on the outside of the mold plate, thereby preventing the deformation of the mold plate.

In the production process according to the present invention, the quartz plates, or the transparent glass plates or plastic plates, on the surfaces of which the diffraction grating has been formed, may be used in both of the pair of mold plates 10, 10 making up the mold M for cast polymerization. It is also possible to use such a transparent plate having an optical low-pass filtering function in one of the pair of mold plates and a common transparent glass plate or plastic plate having no optical low-pass filtering function as the other mold plate.

Figure 2A:
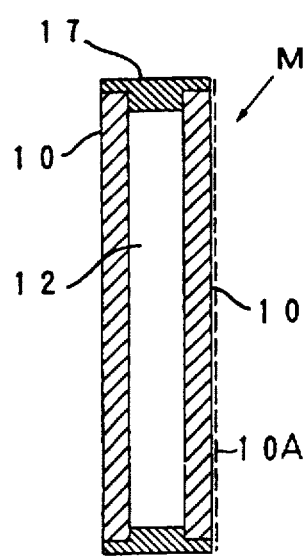
FIGS. 2A and 2B are cross-sectional views similar to those illustrated in FIGS. 1A and 1B, respectively, as to another embodiment of the present invention.
Figure 2B:
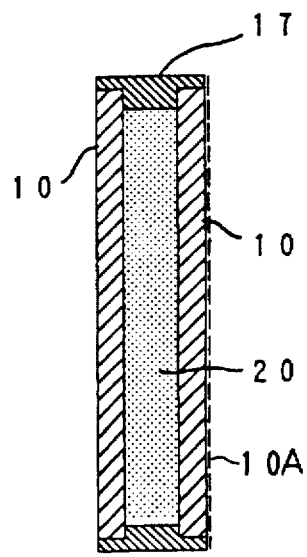

The pair of mold plates 10, 10 arranged so as to oppose to each other with the gap of desired size are fixed by means of a sealing and fixing member composed of a gasket or a pressure sensitive adhesive tape or the like, thereby defining a cavity 12 for the cast polymerization. FIGS. 2A and 2B illustrate an embodiment in which a cavity 12 for the cast polymerization is defined by a sealing and fixing member 17 composed of a gasket arranged along the outer peripheral edges on the inner surfaces of the opposing mold plates 10, 10 in place of the sealing and fixing member 15 composed of the pressure sensitive adhesive tape in the embodiment as illustrated in FIGS. 1A and 1B, though the constitution other than the sealing and fixing member is the same as the embodiment illustrated in FIGS. 1A and 1B. As a material for the gasket, for example, polytetrafluoroethylene, an ethylene-vinyl acetate copolymer, an ethylene-ethyl acrylate copolymer or the like may be used.

When a plate on the surface of which the diffraction grating has been formed is used as a mold plate, it is preferable that the surface, on which the diffraction grating has been formed, should form an outer surface of the mold because a composite optical filter having a great difference in refractive indices at the surface, on which the diffraction grating has been formed, can be provided. This is shown, by way of example schematically in FIGS. 2A and 2B by dashed line 10A.

The quartz plate, or the transparent glass plate or plastic plate, on the surfaces of which the diffraction grating has been formed, used as the mold plate may be coated with an anti-reflecting agent on the surface opposite to the surface by which the cavity is to be defined in order to enhance the light-transmission property.

In the above-described mold, the width of the cavity 12 for the cast polymerization, i.e., the interval between the pair of mold plates 10, 10 is generally controlled to 0.3–3.0 mm.

Another principal constitution factor in the process for production of the composite optical filter according to the present invention is to use, as a material for filling into the cavity to conduct cast polymerization, a specific monomer composition which can provide a polymer having a function to block or attenuate rays in the wavelength range of a near infrared region with high efficiency and a luminosity factor-compensating function, and besides, excellent adhesive property to the mold plates defining the cavity, and integrally combined with the mold plates.

Such a monomer composition comprises, as an essential component, a specific phosphate group-containing monomer represented by the formula I having, in its molecular structure, a phosphate group capable of being bonded to a metal ion composed of a copper ion, which will be described subsequently. A copolymer obtained by polymerizing this monomer composition contains the metal ion composed of a copper ion, which has been introduced through the phosphate group, and shows a characteristic light-absorption property at a near infrared region.

In this specific phosphate group-containing monomer, an acryloyloxy group or a methacryloyloxy group, which is a radical-polymerizable functional group, is bonded in its molecule through an ethylene oxide group, and so the monomer is high in copolymerization reactivity and may be copolymerized with various monomers.

As represented by the formula II, the group R in the formula I is an acryloyloxy group (when X is a hydrogen atom) or a methacryloyloxy group (when X is a methyl group), to which at least one ethylene oxide group has been bonded. Here, the recurring number m of the ethylene oxide groups is an integer of 1–5. Any value of m exceeding 5 results in a copolymer greatly lowered in hardness. Therefore, no practicable filter element can be provided.

The number n of the hydroxyl groups in the formula I is selected from 1 and 2. A specific phosphate group-containing monomer in which the value of n is 2 is a monomer which is high in bonding ability to ionic metals such as a copper ion and has one radical-polymerizable functional group bonded to the phosphorus atom. On the other hand, a specific phosphate group-containing monomer in which the value of n is 1 is a monomer which has two radical-polymerizable functional groups bonded to the phosphorus atom and hence is crosslink-polymerizable.

As described above, the value of n may be selected according to the performance required of the resulting copolymer, the intended end application and molding or forming process thereof, etc. However, the specific phosphate group-containing monomer in which the value of n is 1 and the specific phosphate group-containing monomer in which the value of n is 2 may preferably be used in combination. In particular, the combined use of the monomer in which the value of n is 1 with the monomer in which the value of n is 2 in a molar ratio of 1:5 to 5:1 is preferred because the solubility of a metallic compound composed of a copper compound in such a monomer mixture becomes high.

The monomer composition used in the production process according to the present invention contains at least one monomer copolymerizable with the specific phosphate group-containing monomer (hereinafter referred to as "a copolymerizable monomer"). The combined use of the specific phosphate group-containing monomer with the copolymerizable monomer improves high hygroscopicity which is a defect of a polymer obtained by polymerizing the specific phosphate group-containing monomer alone and can provide a polymer well balanced among performance characteristics in that it is high in hardness, excellent in heat resistance and self-retention of shape, and moreover superb in bond property to the mold plates such as a quartz plate.

No particular limitation is imposed on such a copolymerizable monomer so far as it satisfies the following properties:

(1) being miscible and soluble uniformly with the specific phosphate group-containing monomer used;

(2) having good radical polymerizability with the specific phosphate group-containing monomer used; and (3) being able to provide an optically transparent copolymer.

As specific examples of such a copolymerizable monomer, may be mentioned lower alkyl acrylates and lower alkyl methacrylates the alkyl groups of which have 1–8 carbon atoms, such as methyl acrylate, methyl methacrylate, ethyl acrylate, ethyl methacrylate, n-propyl acrylate and n-propyl methacrylate; modified alkyl acrylates and modified alkyl methacrylates in which the alkyl group has been substituted by a glycidyl group, hydroxyl group or the like, such as glycidyl acrylate, glycidyl methacrylate and 2-hydroxybutyl methacrylate; polyfunctional acrylates and polyfunctional methacrylates such as ethylene glycol dimethacrylate, diethylene glycol dimethacrylate, polyethylene glycol dimethacrylate, 1,4-butanediol diacrylate, 1,4-butanediol dimethacrylate, 2,2-bis[4-methacryloxyethoxyphenyl]propane, trimethylol-propane triacrylate, pentaerythritol trimethacrylate and pentaerythritol tetramethacrylate; unsaturated carboxylic acids such as acrylic acid and methacrylic acid; and aromatic vinyl compounds such as styrene, α-methylstyrene, halogenated styrenes, methoxystyrene and divinylbenzene. These compounds may be used either singly or in any combination thereof.

In the production process according to the present invention, the proportion by mass of the specific phosphate group-containing monomer to all the monomers in the monomer composition preferably amounts to 3–90 mass %, particularly 5–80 mass %. If this proportion is lower than 3 mass %, it is difficult to provide a copolymer having favorable light-absorption property in a near infrared region. On the other hand, any proportion exceeding 90 mass % results in a copolymer high in hygroscopicity and lowered in hardness and bonding property to the mold plates. It is hence not preferable to use the specific phosphate group-containing monomer in any proportion outside the above range.

The monomer composition used in the production process of the composite optical filter according to the present invention contains the metallic compound composed of a copper compound in addition to the specific phosphate group-containing monomer and the copolymerizable monomer.

This metallic compound serves as a supply source of a metal ion which has an effect to absorb rays in the wavelength range of a near infrared region with high efficiency in interaction with the phosphate group contained in the copolymer. The term "composed of a copper compound" as used herein means that the proportion of the copper ion in all the metal ions supplied from the metal compound accounts for at least 80 mass %. Accordingly, the metallic compound composed of a copper compound is a copper compound composed of a divalent copper ion or a metallic compound mixture containing a copper compound composed of a divalent copper ion and metallic compounds composed of other metal ions in proportions satisfying the above-described conditions.

When the proportion of the copper ion is lower than 80 mass % based on the total mass of all the metal ions supplied from the metallic compound, the resulting copolymer has lowered light-absorption property in a near infrared region.

The proportion of the metallic compound contained in the copolymer obtained by the cast polymerization of the monomer composition is preferably 0.1–50 parts by mass, more preferably 0.1–40 parts by mass based on 100 parts by mass of the copolymer. If the proportion of the metallic compound is lower than 0.1 part by mass, it is impossible to provide any copolymer having sufficient light-absorption property in a near infrared region. On the other hand, any proportion exceeding 50 parts by mass results in difficulty in providing a copolymer in which the metallic compound is uniformly dispersed. Further, the proportion in terms of the copper ion is preferably 0.1–20 parts by mass based on 100 parts by mass of the copolymer.

As the copper compound constituting the metallic compound, there may be used various kinds of copper compounds. As specific examples thereof, may be mentioned anhydrides and hydrides of copper acetate, copper chloride, copper formate, copper stearate, copper benzoate, copper ethylacetoacetate, copper pyrophosphate, copper naphthenate, copper citrate and the like. However, the copper compounds are not limited to these compounds only.

The other metallic compounds constituting the metallic compound may be chosen for use from metallic compounds of sodium, potassium, calcium, iron, manganese, cobalt, magnesium, nickel and the like within limits lower than 20 mass % of the total mass of all the metal ions as necessary for the end intended.

The present invention will hereinafter be described by the following examples. However, this invention is not limited to and by these examples.

All designations of "part" or "parts" as will be used in the following examples mean part or parts by mass.

EXAMPLE 1

Two quartz plates for optical low-pass filter (quarts plates cut in such a manner that an angle of an optical axis formed with a plane of incidence of light is 45 degrees) having a diameter of 20 mm and thicknesses of 1.2 mm and 1.6 mm, respectively, were used as a pair of mold plates. They were fixed in parallel in a state opposed to each other with a gap of 1.6 mm by a polytetrafluoroethylene gasket, thereby forming a mold having a cavity for cast polymerization.

On the other hand, the following monomers, metallic compound and polymerization initiator were stirred and mixed to fully dissolve the metallic compound in the monomers, thereby preparing a monomer composition. This monomer composition was filled into the cavity of the mold and successively heated at varied temperatures as 45° C. for 16 hours, 60° C. for 8 hours and 90° C. for 3 hours to conduct cast polymerization, thereby producing a composite optical filter in which a filter element composed of a crosslinked copolymer containing a copper compound was integrally joined as an intermediate filter layer to and between filter elements composed of the two quartz plates used as the mold plates.

| Monomers: | |
|---|---|
| Specific phosphate group-containing monomer represented by the following formula III | 14 parts |
| Specific phosphate group-containing monomer represented by the following formula IV | 6 parts |
| Methyl methacrylate | 58.5 parts |
| Diethylene glycol dimethacrylate | 20 parts |
| α-Methylstyrene | 1.5 parts |
| Metallic compound: | |
| Anhydrous copper benzoate | 14 parts |
| Polymerization initiator: | |
| t-Butyl peroxypivalate | 2.0 parts |
| Formula III and Formula IV: | |

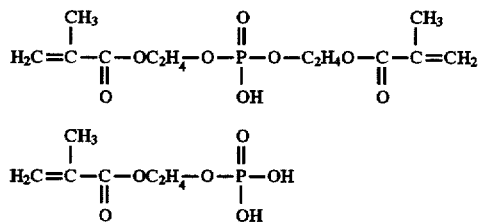

The amount of the metallic compound in this monomer composition corresponds to 2.9 parts in terms of the amount of a copper ion.

A heat cycle test was conducted on the thus-obtained composite optical filter. In the heat cycle test, the sample filter was subjected ten times to a treatment in which the filter was held at −40° C. for 1 hour and then at 85° C. for 1 hour as one cycle, repeatedly. As a result, neither separation between the filter elements composed of the quartz plates and the filter element composed of the crosslinked copolymer nor any other abnormality was recognized on this composite optical filter.

This composite optical filter was mounted in a video camera to perform an actual picture test. As a result, noise due to a moire pattern and aliasing strain was reduced as compared with the case where this composite optical filter was not mounted. By this fact, it was confirmed that this composite optical filter had an effective optical low-pass filtering function.

Besides, the spectral transmittances of this composite optical filter were measured by a spectrophotometer. As a result, it was revealed that no light absorption was recognized in a visible region, and this optical filter was excellent in light-transmission property in a visible region. On the other hand, the light transmittances in the wavelength range (700–1.000 nm) of a near infrared region are not higher than 10%, and so this optical filter was recognized to absorb rays in the wavelength range of the near infrared region with high efficiency.

EXAMPLE 2

Two quartz plates similar to those used in Example 1 were used as mold plates. These two quartz plates were arranged in parallel so as to oppose to each other with a gap of 0.5 mm, and fixed by winding a pressure sensitive adhesive tape around outer peripheries of both quartz plates, thereby forming a mold having a cavity for cast polymerization.

The following monomers, metallic compound and polymerization initiator were then stirred and mixed to fully dissolve the metallic compound in the monomers, thereby preparing a monomer composition. This monomer composition was filled into the cavity of the mold and successively heated at varied temperatures as 45° C. for 16 hours, 60° C. for 8 hours and 90° C. for 3 hours to conduct cast polymerization, thereby producing a composite optical filter in which a filter element composed of a crosslinked copolymer containing a copper compound was integrally joined as an intermediate filter layer to and between filter elements composed of the two quartz plates.

| Monomers: | |
|---|---|
| Specific phosphate group-containing monomer represented by the formula III | 32 parts |
| Specific phosphate group-containing monomer represented by the formula IV | 13 parts |
| Methyl methacrylate | 34 parts |
| Diethylene glycol dimethacrylate | 20 parts |
| α-Methylstyrene | 1 part |
| Metallic compound: | |
| Anhydrous copper benzoate | 32 parts |
| Polymerization initiator: | |
| t-Butyl peroxypivalate | 2.0 parts |

The amount of the metallic compound in this monomer composition corresponds to 6.6 parts in terms of the amount of a copper ion.

With respect to the thus-obtained composite optical filter, a heat cycle test, an actual picture test by mounting it in a video camera and measurement of spectral transmittances by a spectrophotometer were performed in the same manner as in Example 1. As a result, it was confirmed that neither separation between the filter elements composed of the quartz plates and the filter element composed of the crosslinked copolymer nor any other abnormality was recognized on this composite optical filter, and it had an excellent optical low-pass filtering function and was also excellent in light-transmission property in a visible region and light-absorption property in the wavelength range of a near infrared region.

EXAMPLE 3

A composite optical filter was produced in the same manner as in Example 1 except that the following monomers, metallic compounds (the amount of an iron ion: about 5.5 mass % based on the total mass of all the metal ions) and polymerization initiator were stirred and mixed to fully dissolve the metallic compound in the monomers, thereby preparing a monomer composition.

| Monomers: | |
| --- | --- |
| Specific phosphate group-containing monomer represented by the formula III | 15 parts |
| Specific phosphate group-containing monomer represented by the formula IV | 15 parts |
| Methyl methacrylate | 45 parts |
| 1,4-Butanediol diacrylate | 20 parts |
| Methacrylic acid | 5 parts |
| Metallic compounds: | |
| Anhydrous copper acetate | 15 parts |
| Iron (II) oxalate dihydrate ($FeC_2O_4 \cdot 2H_2O$) | 1 part |
| Polymerization initiator: | |
| t-Butyl peroxypivalate | 2.0 parts |

The amount of the metallic compounds in this monomer mixture corresponds to 5.3 parts in terms of the amount of a copper ion and 0.31 parts in terms of the amount of an iron ion.

With respect to the thus-obtained composite optical filter, a heat cycle test, an actual picture test by mounting it in a video camera and measurement of spectral transmittances by a spectrophotometer were performed in the same manner as in Example 1. As a result, it was confirmed that neither separation between the filter elements composed of the quartz plates and the filter element composed of the crosslinked copolymer nor any other abnormality was recognized on this composite optical filter, and it had an excellent optical low-pass filtering function and was also excellent in light-transmission property in a visible region and light-absorption property in the wavelength range of a near infrared region.

EXAMPLE 4

Cast polymerization was performed in the same manner as in Example 1 except that two optical glass filters (BK-7, products of Corning Co.), on a surface of each of which a phase grating pattern having a pitch of 160 μm and a sinusoidal sectional shape had been stamped, and each of which had a diameter of 30 mm and a thickness of 1.5 mm, were used as mold plates, these two optical glass filters were arranged in parallel in a state that they were opposed to each other with a gap of 1.6 mm, and that the surfaces, on which the phase grating pattern had been formed, formed outer surfaces, and fixed by winding a pressure sensitive adhesive tape around outer peripheral surfaces of both optical filters, thereby forming a mold having a cavity for cast polymerization, and this mold was used, thereby producing a composite optical filter in which a filter element composed of a crosslinked copolymer containing a copper compound was integrally joined as an intermediate filter layer to and between the two optical low-pass filter elements made of glass, on the outer surfaces of which the phase grating pattern had been stamped.

With respect to the thus-obtained composite optical filter, a heat cycle test and an actual picture test by mounting it in a video camera were performed in the same manner as in Example 1. As a result, it was confirmed that neither separation between the optical low-pass filter elements made of glass, on the surfaces of which the phase grating pattern had been stamped, and the filter element composed of the crosslinked copolymer nor any other abnormality was recognized on this composite optical filter, and noise due to a moire pattern and aliasing strain was reduced as compared with the case where this composite optical filter was not mounted, and so this composite optical filter had an effective optical low-pass filtering function.

Besides, the spectral transmittances of this composite optical filter were measured by a spectrophotometer. As a result, it was confirmed that the light transmittances in a visible region were as high as not lower than 60%, and so the optical filter is excellent in transparency, while the light transmittances in the wavelength range of a near infrared region were not higher than 10%, and so the optical filter absorbed rays in the wavelength range of the near infrared region with high efficiency.

EXAMPLE 5

Two optical low-pass plastic filters (Zeonex, products of Nippon Zeon Co., Ltd.), on a surface of each of which a phase grating pattern having a pitch of 160 μm and a sinusoidal sectional shape had been stamped, and each of which had a diameter of 25 mm and a thickness of 1.0 mm, were used as mold plates. These two optical low-pass plastic filters were arranged in parallel in a state that they were opposed to each other with a gap of 0.5 mm, and that the surfaces, on which the phase grating pattern had been formed, formed outer surfaces, and fixed by a polytetrafluoroethylene gasket, thereby forming a mold having a cavity for cast polymerization. A monomer composition prepared by using the same monomers, metallic compound and polymerization initiator as those used in Example 2 was filled into the cavity of the mold to conduct cast polymerization under the same conditions as in Example 2, thereby producing a composite optical filter in which a filter element composed of a crosslinked copolymer containing a copper compound was integrally joined as an intermediate filter layer to and between the two optical low-pass filter elements made of plastic.

With respect to the thus-obtained composite optical filter, a heat cycle test, an actual picture test by mounting it in a video camera and measurement of spectral transmittances by a spectrophotometer were performed in the same manner as in Example 1. As a result, it was confirmed that neither separation between the plastic optical low-pass filter elements and the filter element composed of the crosslinked copolymer nor any other abnormality was recognized on this composite optical filter, and it had an excellent optical low-pass filtering function and was also excellent in light-transmission property in a visible region and light-absorption property in the wavelength range of a near infrared region.

What is claimed is:

1. A process for production of a composite optical filter, which comprises the steps of arranging a pair of transparent plates at least one of which has an optical low-pass filtering function, so as to oppose to each other with a gap, thereby forming a mold in which a cavity for cast polymerization is defined between the pair of transparent plates; and filling a monomer composition composed of (a) a monomer represented by the following formula I:

$$PO(OH)_n R_{3-n} \qquad I$$

wherein R means a polymerizable functional group represented by the following formula II:

$$CH_2=CXCOO(C_2H_4O)_m- \qquad II$$

in which X denotes a hydrogen atom or a methyl group, and m is an integer of 1–5, and n is 1 or 2, (b) a monomer copolymerizable therewith, and (c) a metallic compound composed of a copper compound, into the cavity of the mold, thereby subjecting the monomer composition to a polymerization treatment;

and wherein any one of the transparent plates making up the molds is composed of any one of a glass plate and a plastic plate, on at least one surface of which a diffraction grating has been formed.

2. A process for production of a composite optical filter, which comprises the steps of arranging a pair of transparent plates at least one of which has an optical low-pass filtering function, so as to oppose to each other with a gap, thereby forming a mold in which a cavity for cast polymerization is defined between the pair of transparent plates; and filling a monomer composition composed of (a) a monomer represented by the following formula I:

$$PO(OH)_n R_{3-n} \qquad I$$

wherein R means a polymerizable functional group represented by the following formula II:

$$CH_2=CXCOO(C_2H_4O)_m- \qquad II$$

in which X denotes a hydrogen atom or a methyl group, and m is an integer of 1–5, and n is 1 or 2, (b) a monomer copolymerizable therewith, and (c) a metallic compound composed of a copper compound, into the cavity of the mold, thereby subjecting the monomer composition to a polymerization treatment;

and wherein any one of the transparent plates making up the molds is composed of any one of a glass plate and a plastic plate, on at least one surface of which a diffraction grating has been formed, and arranged in such a manner that a surface, on which the diffraction grating has been formed, forms an outer surface of the mold.

3. The production process according to claim 1, wherein the proportion of the monomer represented by the formula I is 3–90 mass % based on the total mass of monomers contained in the monomer composition.

4. A composite optical filter comprising a pair of transparent plates at least one of which has an optical low-pass filtering function, and an intermediate filter layer laminated so as to interpose between the pair of transparent plates, wherein the intermediate layer is formed of a copolymer formed by polymerizing (a) a monomer composition composed of a monomer represented by the following formula I:

$$PO(OH)_n R_{3-n} \qquad I$$

wherein R means a polymerizable functional group represented by the following formula II:

$$CH_2=CXCOO(C_2H_4O)_m- \qquad II$$

in which X denotes a hydrogen atom or a methyl group, and m is an integer of 1–5, and n is 1 or 2, (b) a monomer copolymerizable therewith, and (c) a metallic compound composed of a copper compound in a cavity for cast polymerization defined between the pair of transparent plates;

and wherein any one of the transparent plates having an optical low-pass filtering function is composed of any one of a glass plate and a plastic plate, on at least one surface of which a diffraction grating has been formed.

5. The composite optical filter according to claim 1 or claim 4, wherein the proportion of a copper ion contained in the copolymer constituting the intermediate layer is 0.1–20 parts by mass per 100 parts by mass of the copolymer.

* * * * *